United States Patent [19]
Chikazawa

[11] Patent Number: 5,900,972
[45] Date of Patent: May 4, 1999

[54] STEREOSCOPIC DISPLAY SYSTEM

[75] Inventor: Yoshiharu Chikazawa, Yokohama, Japan

[73] Assignee: Thomson multimedia S.A., Boulogne Cedex, France

[21] Appl. No.: 08/761,955

[22] Filed: Dec. 9, 1996

[30] Foreign Application Priority Data

Dec. 11, 1995 [GB] United Kingdom .................. 9525308

[51] Int. Cl.⁶ .......................... G02B 27/22; G02B 27/26; H04N 13/04; H04N 9/47
[52] U.S. Cl. .......................... 359/464; 359/463; 359/462; 359/465; 348/57; 348/58; 348/56
[58] Field of Search .................... 359/464, 465, 359/462, 463; 348/51, 56, 57, 58; 349/15; 352/58

[56] References Cited

U.S. PATENT DOCUMENTS

| 4,588,259 | 5/1986 | Sheiman | 359/465 |
|---|---|---|---|
| 4,719,507 | 1/1988 | Bos | 359/465 |
| 4,740,073 | 4/1988 | Meacham | 352/58 |
| 4,807,965 | 2/1989 | Garakani | 359/464 |
| 5,315,377 | 5/1994 | Isono et al. | 348/51 |

FOREIGN PATENT DOCUMENTS

| 0226115A2 | 6/1987 | European Pat. Off. | H04N 13/00 |
|---|---|---|---|
| 0540137A1 | 5/1993 | European Pat. Off. | H04N 13/04 |

OTHER PUBLICATIONS

British Search Report dated: Mar. 5, 1996.

*Primary Examiner*—Cassandra Spyrou
*Assistant Examiner*—Audrey Chang
*Attorney, Agent, or Firm*—Joseph S. Tripoli; Dennis H. Irlbeck

[57] ABSTRACT

Stereoscopic effects can be created by binocular parallax. Known stereoscopic display systems show pseudoscopic effects in outer areas of the image viewing position and the viewing position is fixed. To avoid such pseudoscopic effects and/or to change the viewing position stereoscopic displays using parallax barriers with variable pitch length, moving barriers parallel to the display plane, and a polarizing device forming polarized light together with polarizing prisms are provided.

9 Claims, 18 Drawing Sheets

STEREOSCOPIC DISPLAY SYSTEM

The invention relates to a stereoscopic display system, which generates the impression of a stereoscopic image by binocular parallax. Such a system uses a display comprising a pixel plane, wherein right and left images are depicted either alternating for the whole screen or alternating between adjacent pixels.

BACKGROUND OF THE INVENTION

Known stereoscopic display systems use special glasses, for example red and blue filter glasses, LCD shutter goggles or polarizing filter glasses. Other known prior stereoscopic displays use a parallax barrier with a fixed slit pitch or use a lenticular lens sheet. All these known stereoscopic display systems have the disadvantages that they show pseudoscopic images in the outer areas of the viewing area and/or that the viewing position is fixed due to the fixed geometry of the system.

It is therefore an object of the invention to provide a stereoscopic display system which overcomes the drawbacks of the prior art mentioned above.

This object is solved by the subject matter according to the independend claims. Preferred embodiments of the invention are subject of the dependent claims.

SUMMARY OF THE INVENTION

A first embodiment of the stereoscopic display system has a display comprising a pixel plane for alternating displaying right and left images and a parallax barrier made of barrier strips, which are arranged in front of the display, wherein the distance or pitch between adjacent barrier strips is variable. Therefore it is possible to vary the viewing position, which is a function of the distance.

The barrier strips can be realised by any light blocking elements, like e.g. liquid crystal display elements or by mechanical elements.

If the barrier strips include mechanical elements, the variation of the distance can be done by a pantograph, wherein each barrier strip is connected to the pantograph. Preferably each barrier strip is connected to each joint-pivot of the pantograph, wherein one joint-pivot of the pantograph can be fixed in space, so that the position of the pantograph relativ to the display is fixed. The movement of the pantograph can be accomplished by a moving rod mechanism connected to the pantograph, which is controlled by a controller.

Preferably each barrier strip is rotatable, so that the angle between the barriers and the display panel can be varied. Thereby a barrier width, which results by the projection of the barriers onto the display panel can be adjusted in addition to the distance between said barriers. The rotation of the barriers can be performed by a rack and pinion mechanism. Preferably the rack can be moved linearly. The stereoscopic display system is further provided with a controller for controlling a moving-rack mechanism. It is further possible that the pantograph is controlled on both ends by a moving-rod mechanism.

In this embodiment of the stereoscopic display system, adjacent pixels of the pixel plane alternate between left and right images.

It is also possible that a stereoscopic display system includes a display comprising a pixel plane for displaying right and left images, the system further comprises moving barriers arranged in front of the display to line between right and left eye, wherein the barriers are set in a first mode to a first angle, which directs the right image to the right eye when a right image is depicted, and is set in a second mode to a second angle, which directs the left image to the left eye when a left image is depicted on the display.

The barrier of the stereoscopic display system is set on the display essentially perpendicular, i.e. in an intermediate position the angle between the barriers and the surface of the display is approximately 90°.

Preferably the switching between left and right viewing directions is fast enough so that the impression of a continuous image is generated because of the afterimage property of the human eye.

The barriers of the stereoscopic display are connected to a switching means which switches the barriers between left and right image viewing positions. Such a switching means can be formed by a joint arm.

The stereoscopic display system further comprises a moving barrier controller and a display controller to switch between left and right images, both of which are controlled by a common timing signal.

It is further possible that the switching means of the stereoscopic display system comprises a fixed and a joint arm, so that the moving barrier part is independent of the display screen.

It is also possible that the stereoscopic display system according to the invention includes a barrier which consists of a fixed barrier set perpendicular on to the display, and a moving barrier set on top of the fixed barrier, so that in a first state one position of the moving barrier is realised in which the right eye only sees the right image, whereas in the other state another position is realised where the left eye only sees the left image.

The switching between the two positions has to be fast enough, so that the impression of a steady image is generated.

In the stereoscopic display system the moving barrier can move in dependence on the state in a plane parallel to the pixel plane, and the moving barrier can be formed by a sheet with rectangular openings arranged parallel to each other. The system can further comprise a controller, a switcher (i.e. a display controller) and a moving mechanism, wherein the controller and the switcher are controlled by a common timing signal.

In another embodiment of such a stereoscopic display system, the moving barrier is formed by a liquid crystal consisting of stripe type shutters, which can be switched in dependence on the state between transparent and not transparent. Such a system further comprises a controller for controlling the liquid crystal shutters and a switcher for switching between left and right images, which can be both controlled by a common timing signal.

In another embodiment of a stereoscopic display system with a display comprising a pixel plane for displaying right and left images, a polarizing device, which can switch between two states of polarization, is arranged in front of the display followed by a polarizing prism sheet comprising a plurality of prisms, which are arranged one prism next to the other, so that a column type prism sheet is formed, wherein one polarization is deflected by the prisms in a first direction, and the other polarization is deflected in a second direction.

Preferably in such stereoscopic display system each pixel column of the display corresponds to one polarizing prism of the polarizing prism sheet. In other words, each polarizing prism covers one pixel column.

Further the stereoscopic display system comprises a polarizing device controller and a switching means to switch between left and right images, both of which are controlled by a common timing signal.

To further lower the crosstalk of left and right image rays, the shape of each polarizing prism of the polarizing prism sheet differs from one another.

To use a more wide display, it is further possible that each outer prism of the polarizing prism sheet overlaps the adjacent inner prism.

With the above described embodiments of the invention it is possible to adjust the viewing distance and/or to suppress pseudoscopic images in the outer areas of the viewing area.

Preferred embodiments of the invention will now be described with reference to the accompanying drawings, in which:

DETAILED DESCRIPTION OF THE INVENTION

Figure 18:
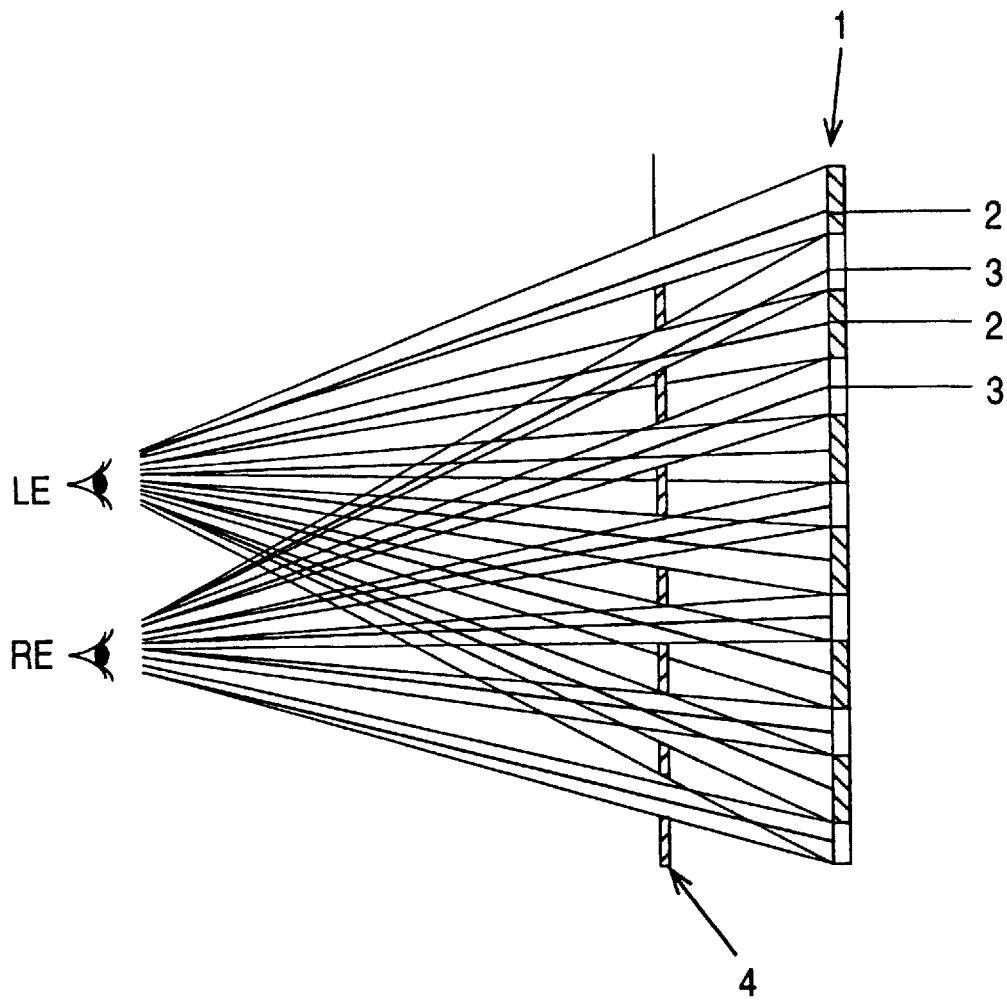
FIG. 18 is a schematic showing the principles of a stereoscopic display system using a parallax barrier system.

FIG. 18 shows the basic principles of a parallax barrier system, comprising a display 1, which forms an image plane or pixel plane comprising alternating left image pixels 2 and right image pixels 3. In this example the image is a so-called mixed strip image, wherein pixels for the left and right image form vertical rows, respectively. As it is clear from the depicted rays of the respective pixels, right image pixels 3 are blocked by the parallax barrier 4 for their way to the left eye, wherein left image pixels 2 are blocked for the right eye. Further it is clear from FIG. 18, that using a parallax barrier 4 with a fixed pitch between the barrier strips results in a fixed viewing distance for the left and right eye LE, RE.

Figure 1:
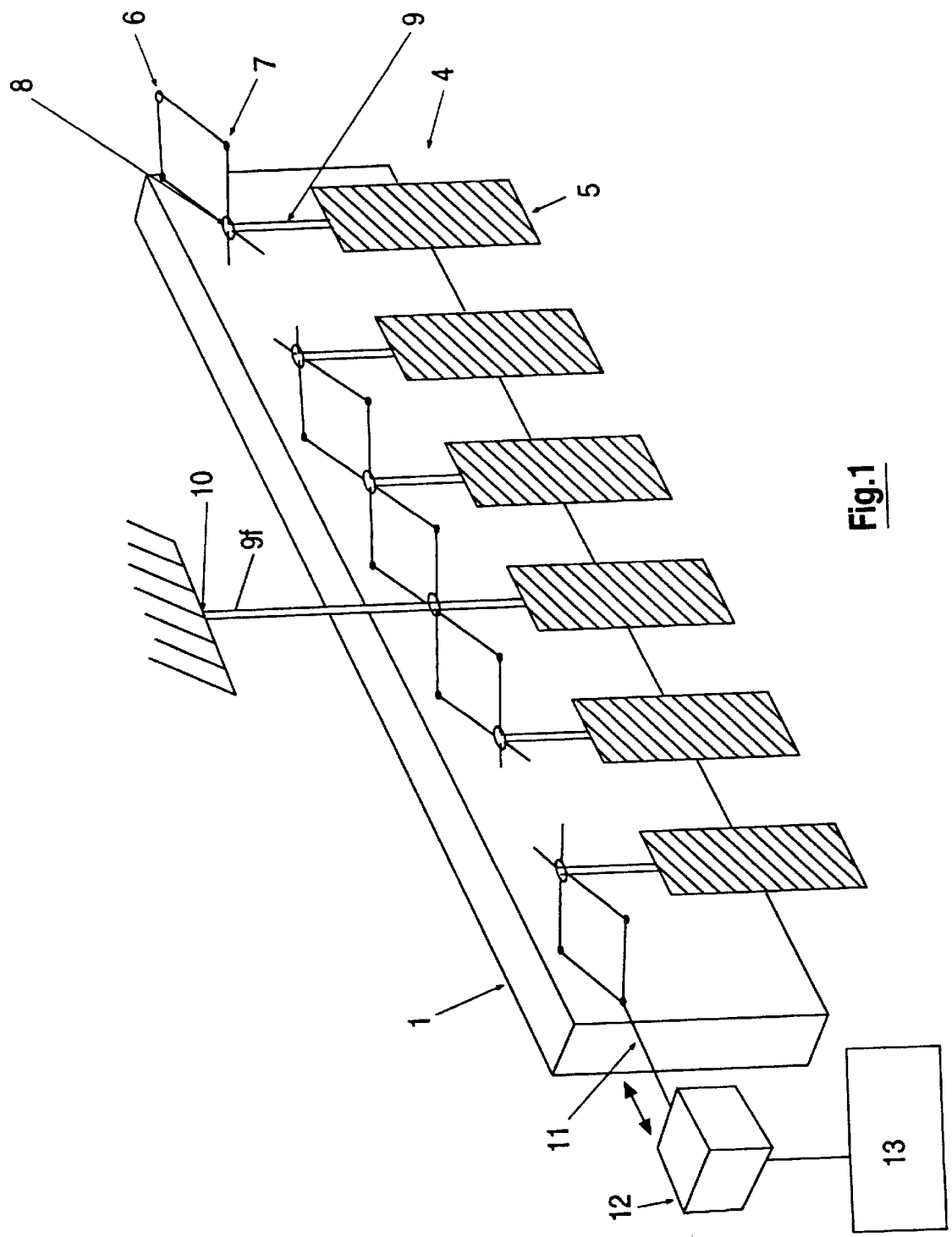
FIG. 1 shows a first embodiment with a parallax barrier system using a pantograph for varying the slit pitch.

FIG. 1 shows an example of a parallax barrier system with a variable viewing distance, wherein the parallax barrier system 4 is arranged in front of a display 1 and consists of a plurality of barrier strips 5, which are arranged parallel to each other and connected with a shaft 9 to a pantograph 6 at a joint pivot 8. The pantograph 6 has normal pivots 7 and joint pivots 8. At one side the pantograph is connected with a moving rod 11 to a moving rod mechanism 12, which is controlled by a controller 13. In this example, one barrier strip 5, preverably the one in the middle, is connected by a shaft 9f to a fixed point 10 in space. With this construction, the distance or slit pitch between the barrier strips 5 can be changed by moving the moving rod 11, which in turn changes the viewing distance.

An according movement is controlled through the controller 13 by a viewer and/or by a control signal, value of which depends on the distance between the viewer and the display 1.

Figure 2:
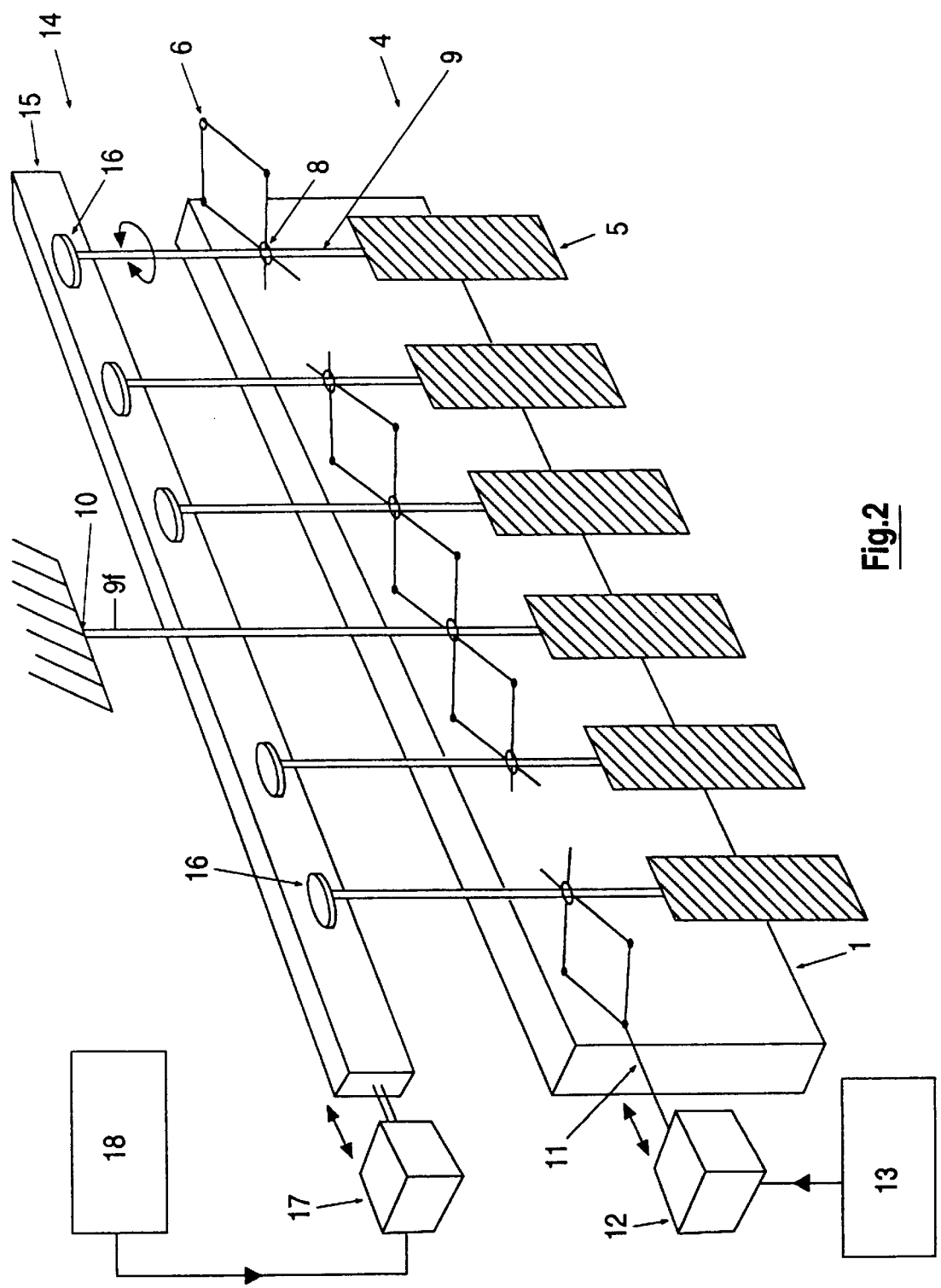
FIG. 2 shows a parallax barrier system, wherein the barrier strips are rotatable.

FIG. 2 shows another embodiment of the inventive parallax barrier system, wherein the shafts 9 of the barrier strips 5 are connected to a rack and pinion mechanism 14 comprising a movable rack 15, which is linear, and pinions 16, which are arranged on top of the shafts 9 of the barrier strips 5. With such a moving rack mechanism 17, which is controlled by a controller 18, the barrier strips 5 can be rotated, so that the angle between the barrier strips 5 and the display panel 1 will be changed, in other words the projection of the barrier strip area onto a plane parallel to the display plane 1 is changed. With this system it is possible to achieve a suitable width of the barrier strips for the chosen pitch of the barrier strips.

Controllers 13, 18 can be controlled e.g. by not shown input means by a viewer and/or by control signals, value of which depends on the distance between the viewer and the display 1.

Figure 3:
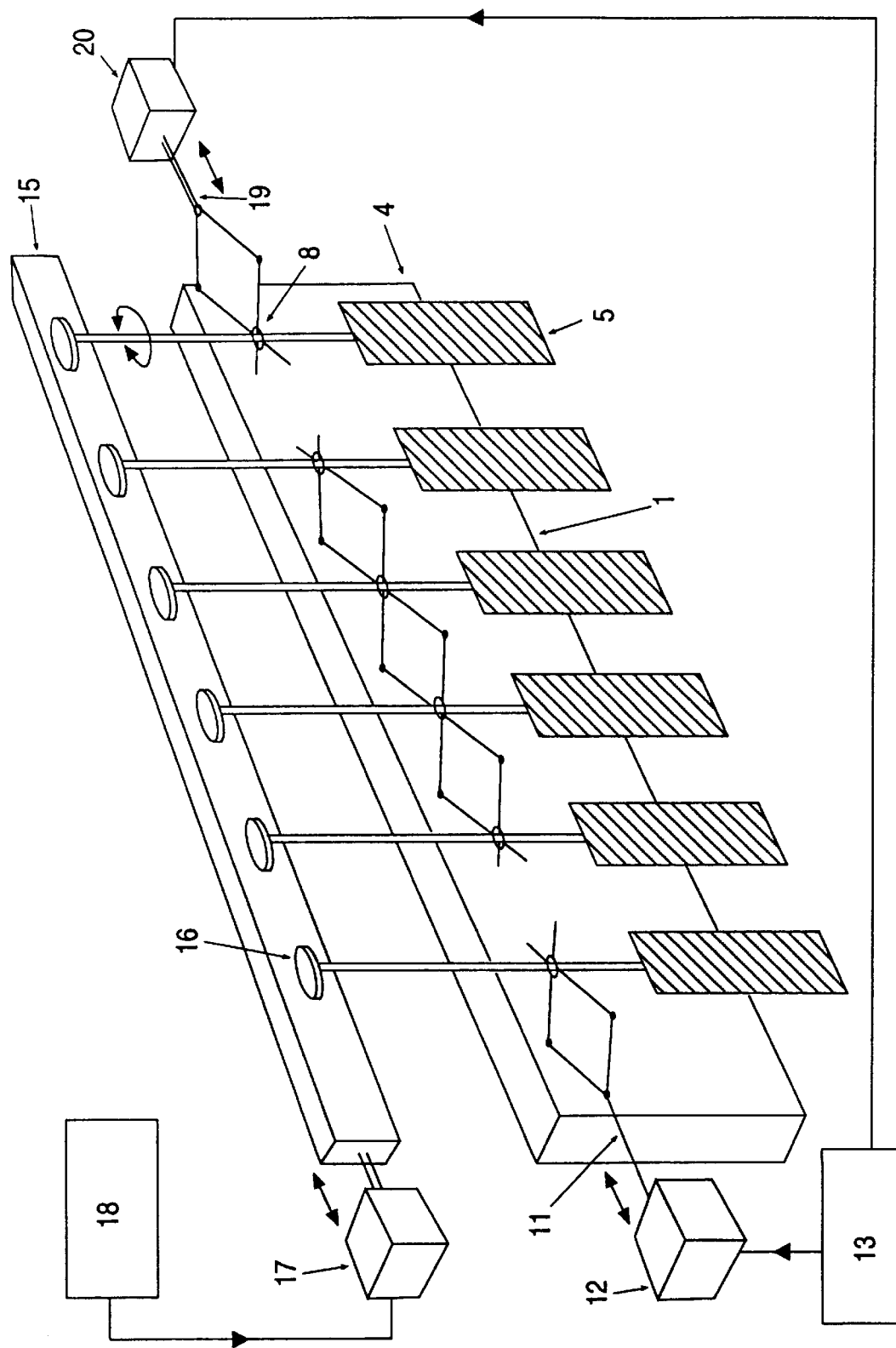
FIG. 3 shows a parallax barrier system, wherein the pantograph is driven from both sides.

FIG. 3 shows a further embodiment of the parallax barrier system according to FIG. 1, wherein the parallax barrier system 4 is driven simultaneously from both sides with a moving rod 11 and 19 through a moving rod mechanism 12 and 20, which are both controlled by a single controller 13. Another difference of the embodiment according to FIG. 3 is, that none of the barrier strips is connected to a fixed point in space. Therefore, it is possible that the pantograph cannot only expand or contract, but also move parallel to the flat panel display 1 without expansion and contraction. Therefore the barrier strips move parallel to the flat panel display 1 and expands or contracts as parallel moving of viewer to the display and changing of viewing distance.

As shown in FIG. 3, the barriers 5 of the preferred embodiment can also be rotated. Of course, means 19 and 20 can also be provided without means 16 to 18.

The pixels 2 dedicated to the right eye and pixels 3 dedicated to the left eye can be adopted accordingly by not shown controller means.

Another (not shown) embodiment of the principle shown by FIGS. 1–3 can be realised by a liquid crystal element. As such an element can be light-transparent or non-transparent in dependence on according control signals, according light-blocking barriers can be displayed by the liquid crystal elements. The size and the distance between the barriers can be controlled by control signals, which can be determined by signals of input means and/or by signals of sensor means. The signal of the input means may be defined by a viewer or user, respectively and the sensor means may generate a signal e.g. in dependence on the distance between the viewer or user, respectively and the display 1.

Figure 4:
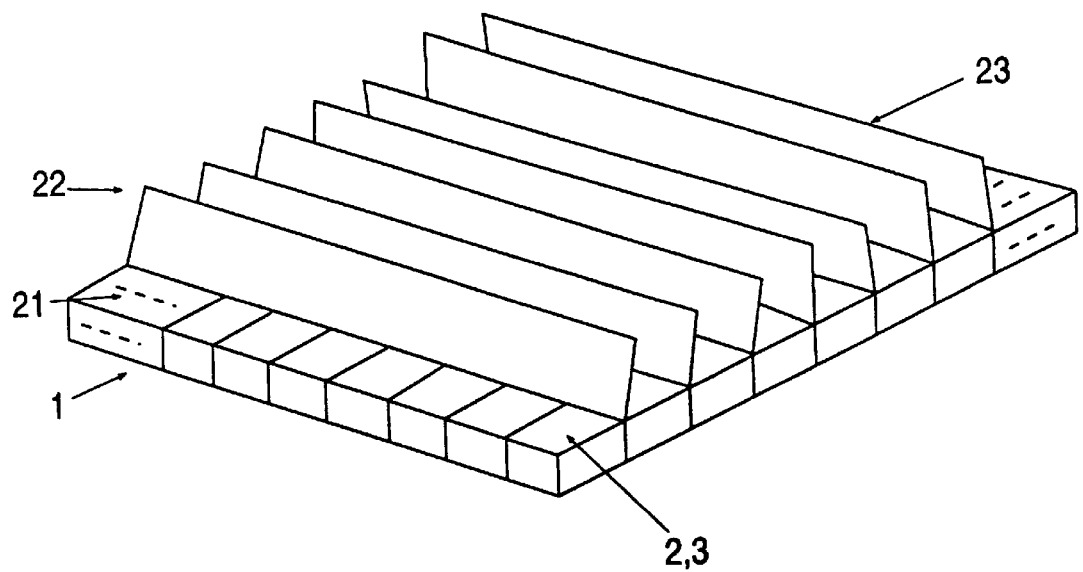
FIG. 4 shows the principles of a stereoscopic display system using a first moving barrier system.

FIG. 4 shows an embodiment of a moving barrier system 22, which is set on a flat panel display 1 consisting of pixels 21. The movable barrier system 22 consists of a plurality of movable barrier strips 23, which are set essentially perpendicular to the surface of the flat panel display 1, so that strips or columns of pixels are formed in the vertical direction. In dependence on the state, the enclosed angle between the movable barrier strips 23 and the surface of the flat panel display 1 can be changed, so that the rays can be directed to the right eye RE or left eye LA, respectively. This will be explained in more detail in FIGS. 5 and 6.

Figure 5:
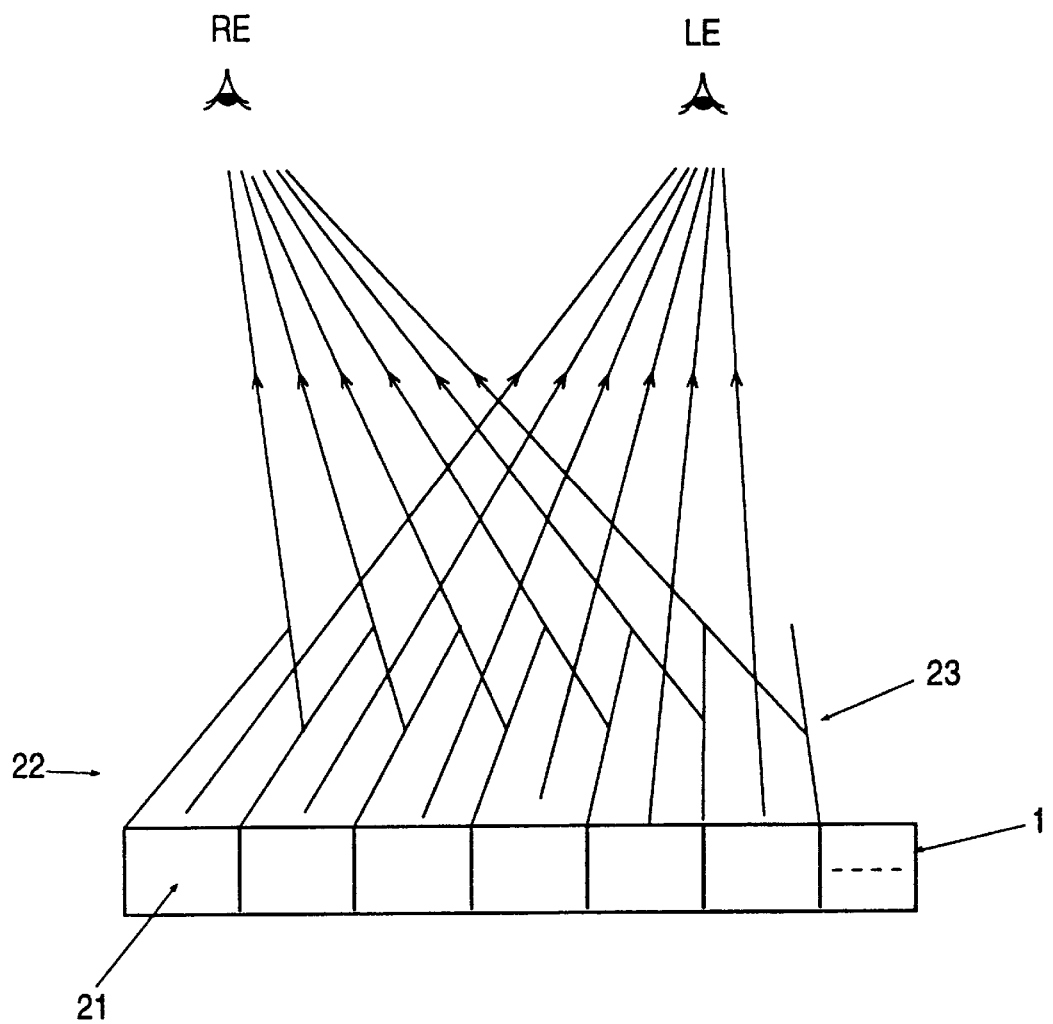
FIG. 5 shows a cross section through a moving barrier system, wherein the left image is directed to the left eye.

FIG. 5 shows a cross section of the embodiment according to FIG. 4. With the shown direction of the movable barrier strips 23 rays from all pixels 21 are directed to the left eye LE, which in turn means, that the flat panel display 1 displays in this case a complete left image. The right eye does not see any image from the surface from the flat panel display 1, but only sees the surfaces of the movable barrier strips.

Figure 6:
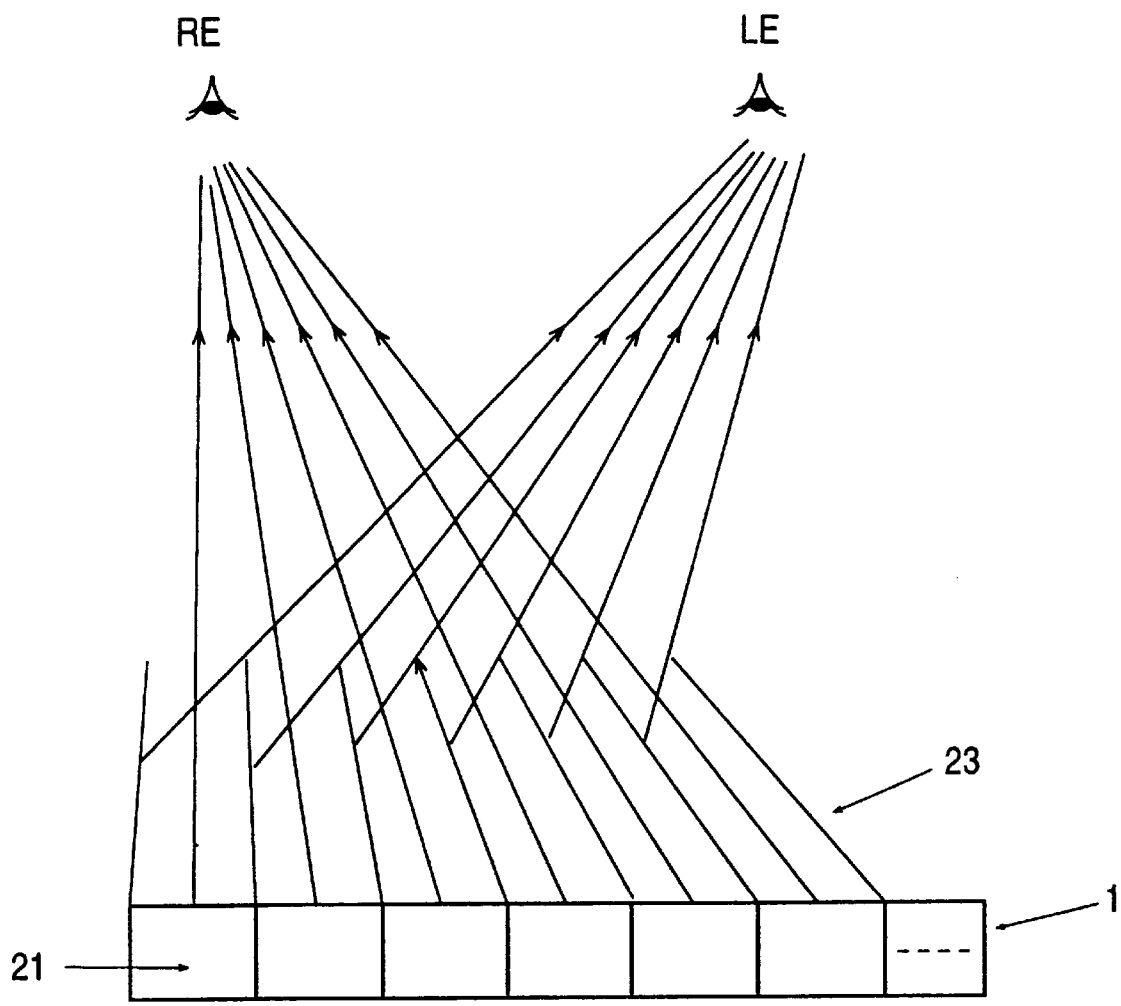
FIG. 6 shows the system of FIG. 5, wherein the light is directed to the right eye.

FIG. 6 shows the other case, wherein the surface of the flat panel display 1 consisting of the pixels 21 can only be seen by the right eye RE, because of the orientation of the movable barrier strips 23. For this reason, in this case the flat panel display 1 has to display a right image.

It is clear from the FIGS. 5 and 6, that the movable barrier strips 23 have to be changed in their directions according to the presence of the left respectively right image. To obtain a stable view or a stable image, the movement of the barrier strips has to be fast enough, e.g. more than 20 times per second, so that using the afterimage of the human eye a stereoscopic impression is created.

Figure 7:
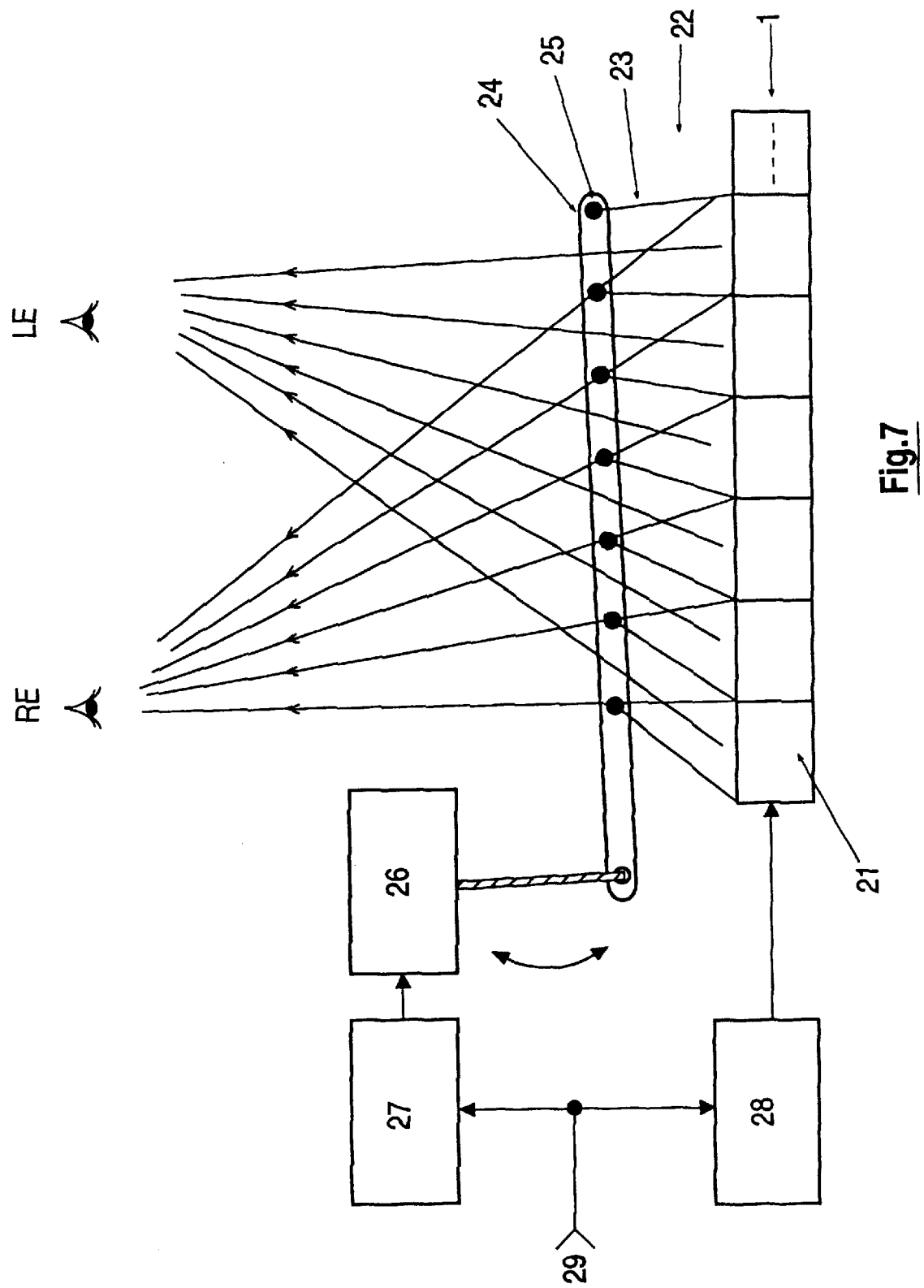
FIG. 7 shows a cross section through a moving barrier system with an example of a driving system for the barriers.

FIG. 7 shows a cross section of an embodiment, wherein the movable barrier strips 23 of the movable barrier system 22 are moved by a joint arm 24. In this embodiment each movable barrier strip 23 is connected to a pivot 25 of the joint arm 24. The joint arm 24 is moved by a moving mechanism 26, which is controlled by a moving barrier controller 27. Further, the display 1 is controlled by a display controller 28. Both controllers, the moving barrier controller 27 and the display controller 28, are controlled by a common timing signal 29, so that the movement of the joint arm 24 is synchronised with the change of the images depicted on the display 1.

Figure 8:
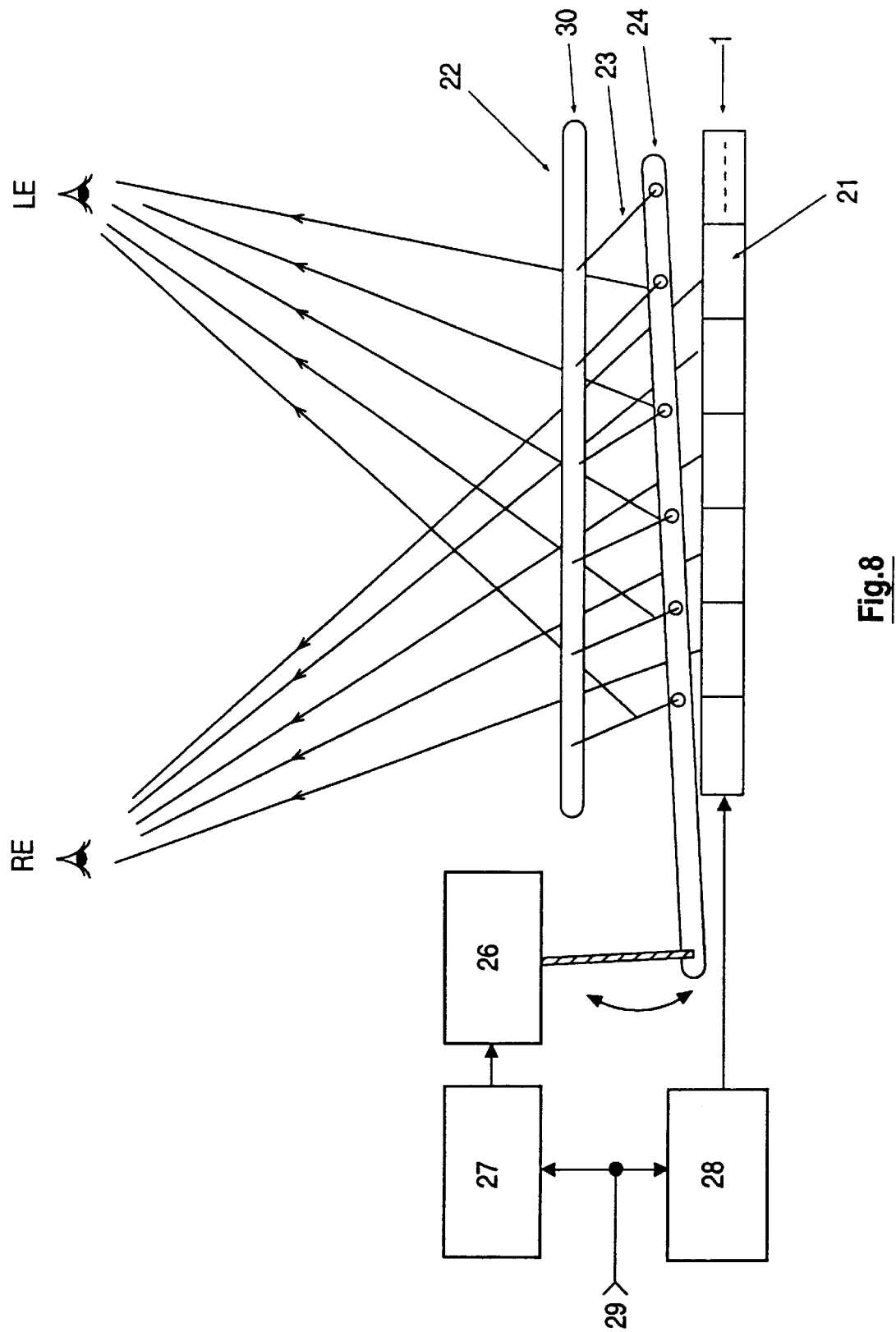
FIG. 8 shows another example of the driving system for the moving barriers.

FIG. 8 shows another embodiment of a stereoscopic display system using a movable barrier system 22, which is not connected to the display 1, i.e. is independent from the display 1. The movable barrier system consists of a fixed arm 13 to which the movable barrier strips 23 are connected. The movable barrier strips 23 are moved by a joint arm 24 through the pivots 25 with a moving system 26. Control of the movement of the movable barrier system 22 and the images on the display 1 is done by the same controller arrangement as in the embodiment according to FIG. 7.

Figure 9:
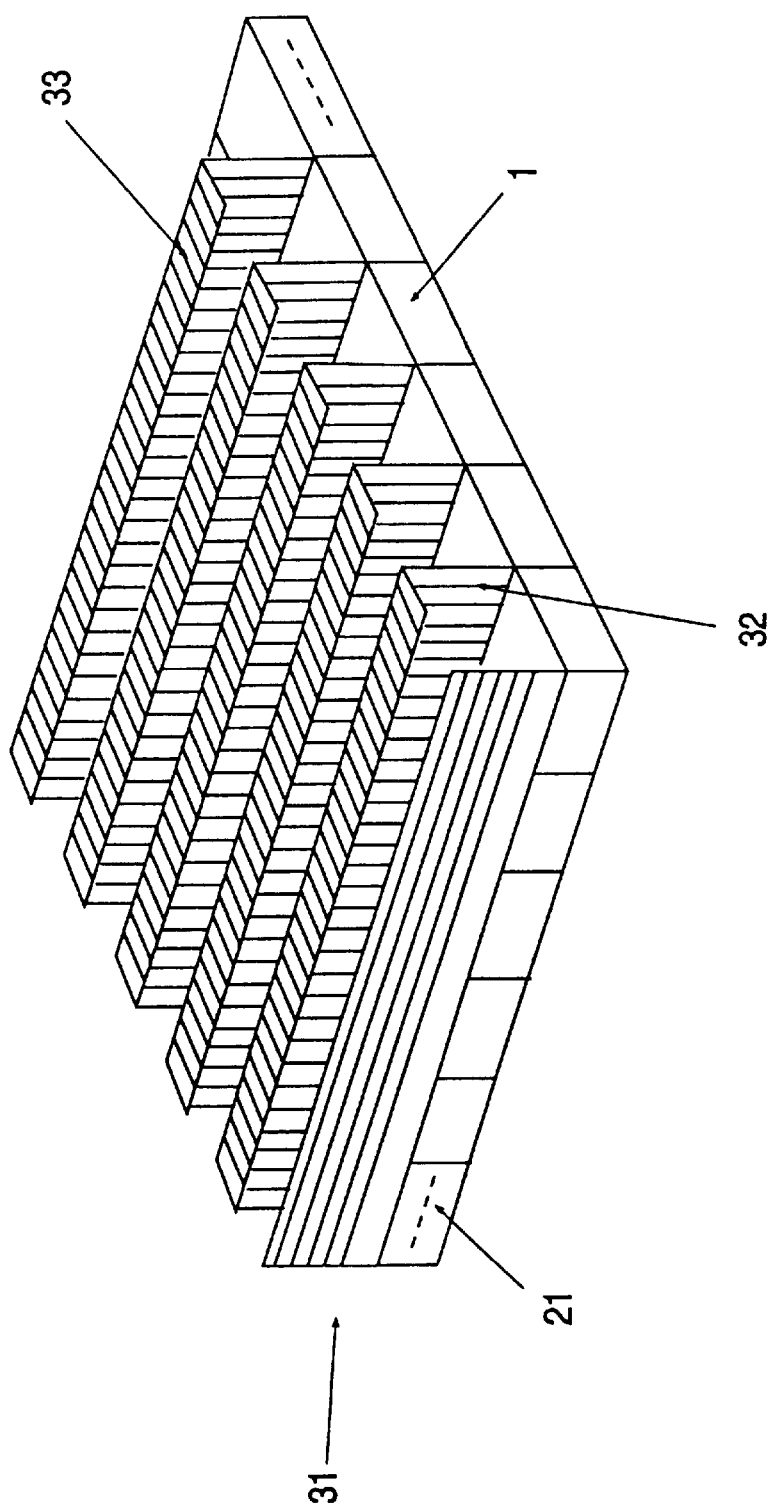
FIG. 9 shows the principles of a stereoscopic display system using a second moving barrier system.

FIG. 9 shows a stereoscopic display system, wherein the light rays between left and right eye are blocked in dependence on the state by a barrier system 31 consisting of fixed barrier strips 32 and movable barrier strips 33. In this embodiment, the fixed barrier strips 32 are set perpendicular on top of the surface of the flat panel display 1, so that columns of pixels 21 are formed. On top of each fixed barrier strip 32 a movable barrier strip 33 is provided, which is in both viewing positions parallel to the surface of the display 1.

Figure 10:
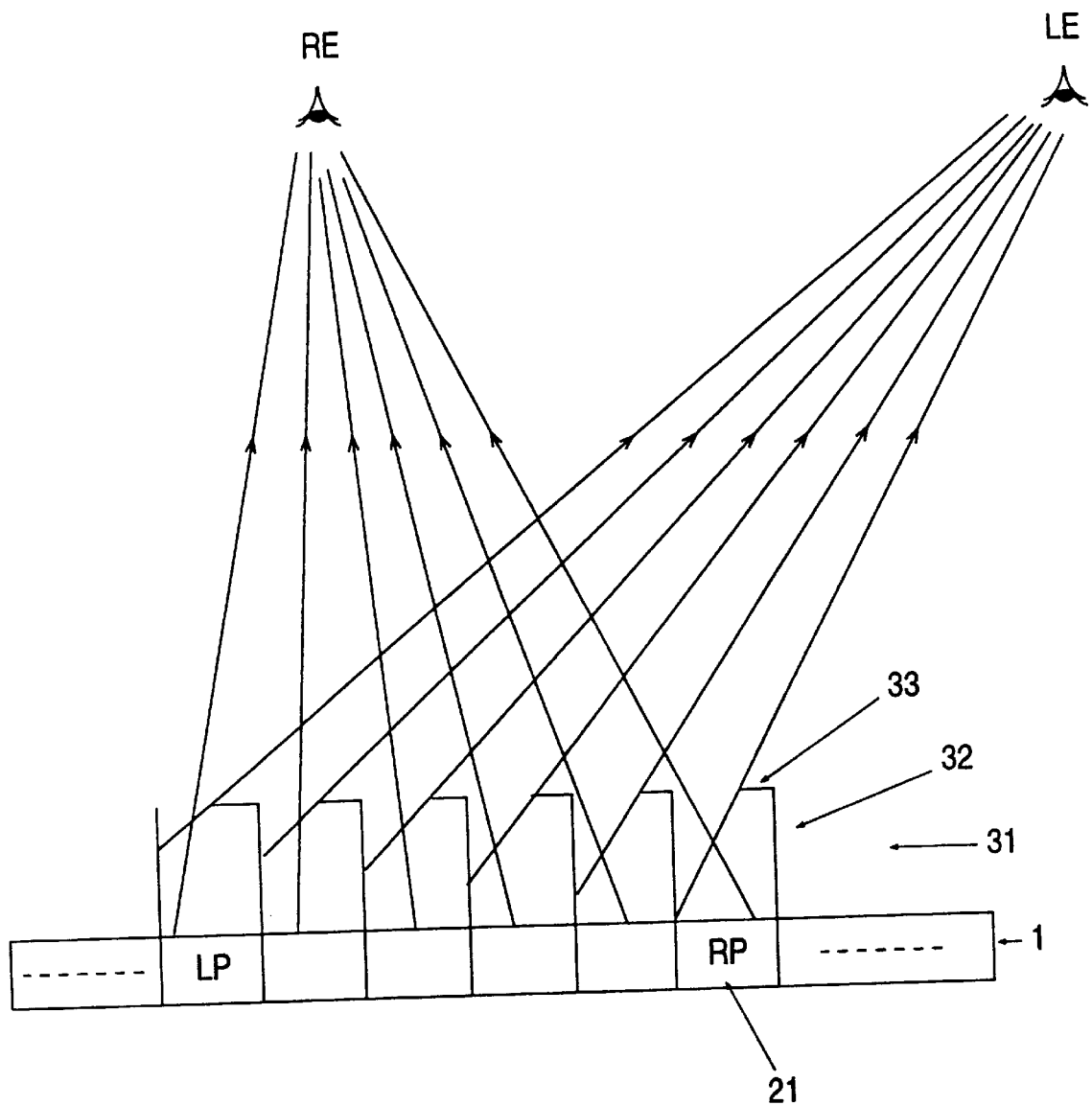
FIG. 10 shows a cross section through the system according to FIG. 9, wherein the light is directed to the right eye.

FIG. 10 shows a cross section of the embodiment according to FIG. 9, wherein the movable barrier strips 33 are pointing to the left of FIG. 10, so that only the right eye can see the image on the surface of the display 1. The left eye only sees the surfaces of the fixed and/or movable barrier strips 32, 33.

Figure 11:
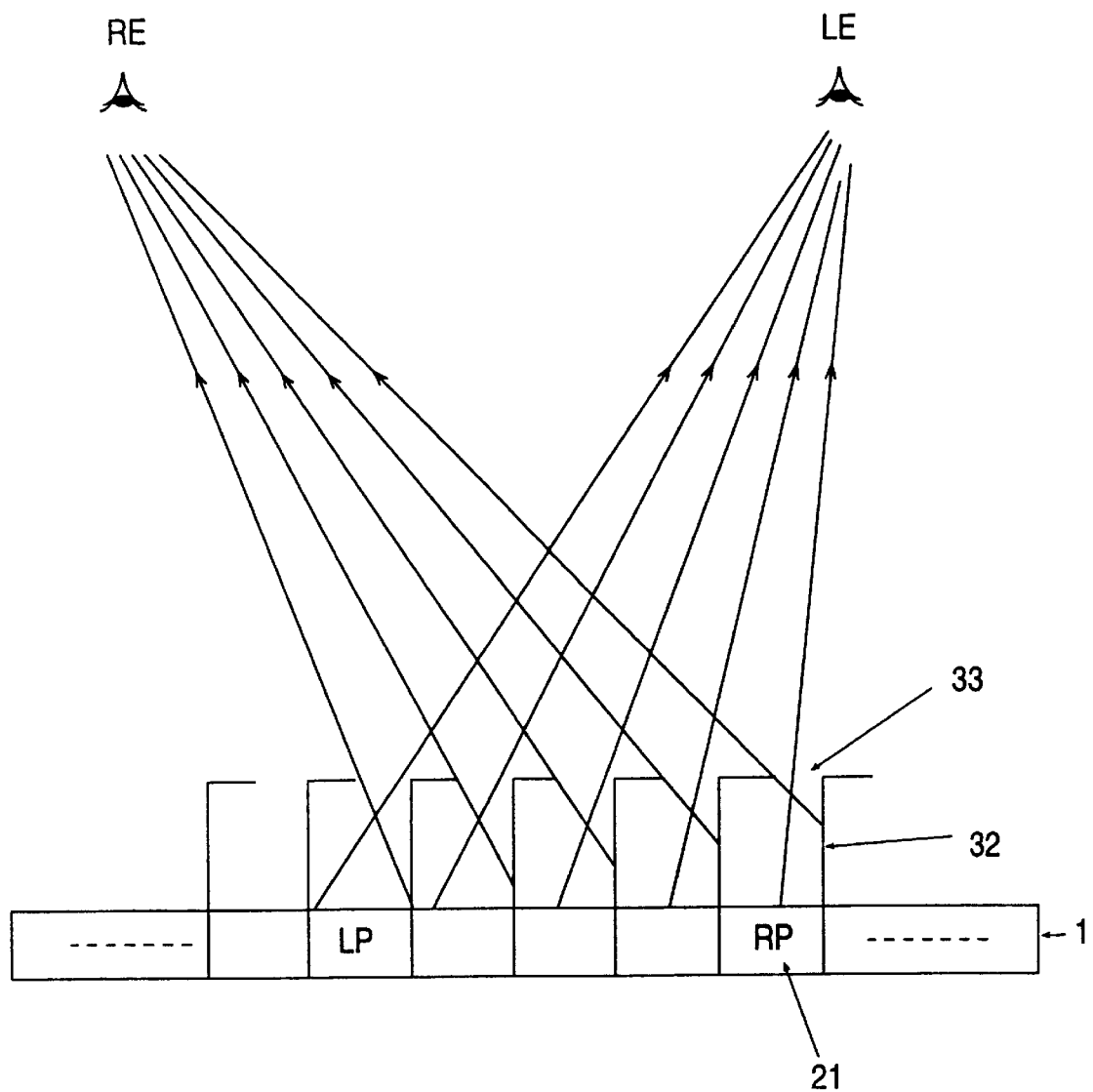
FIG. 11 shows the system of FIG. 10, wherein the light is directed to the left eye.

FIG. 11 shows the other case, in which only the left eye can see the image of the surface of the display 1, which in turn means that now the display 1 has to display a left image. The movable barrier strips 33 are now pointing to the right of FIG. 11.

Figure 12:
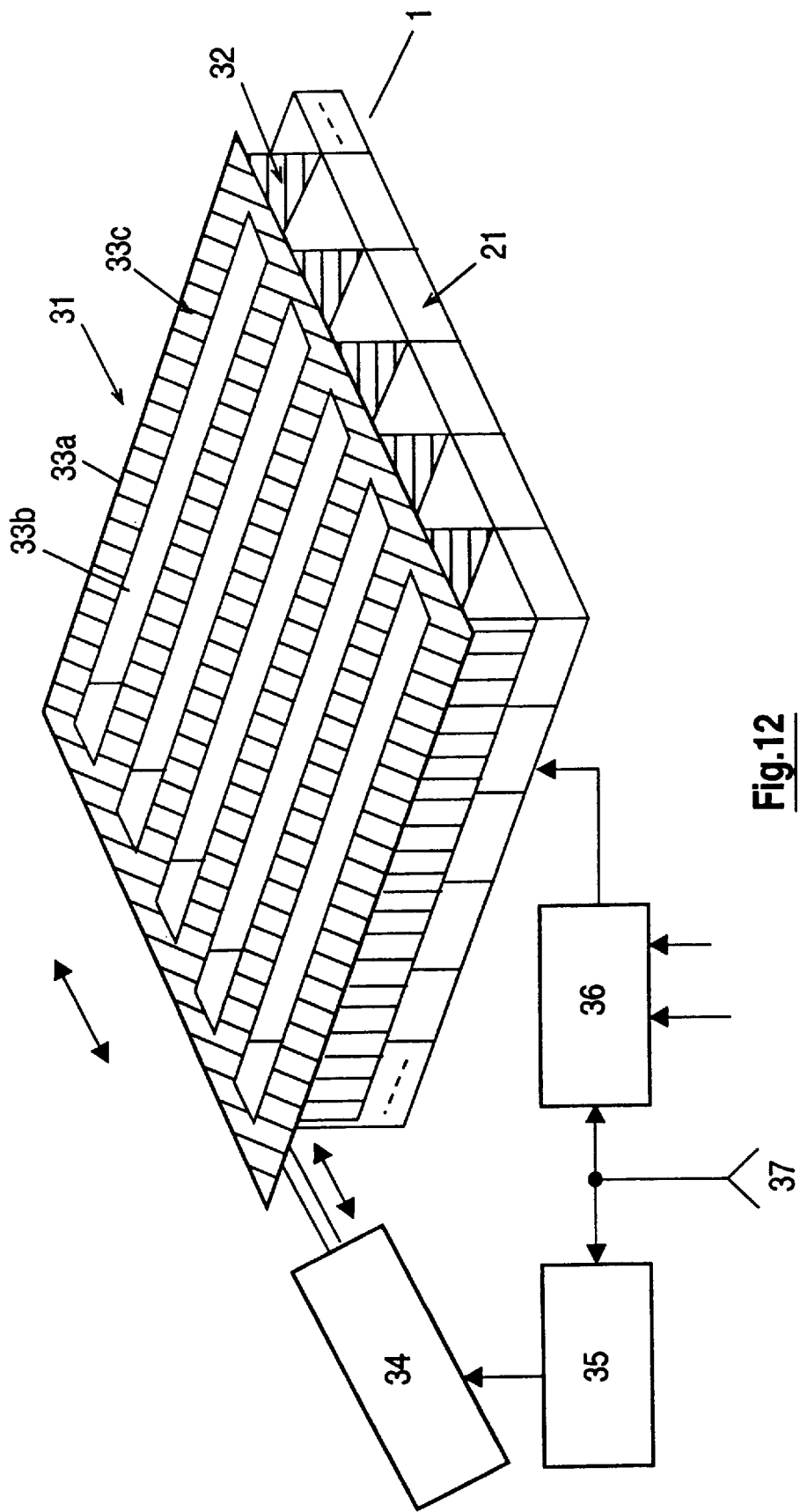
FIG. 12 shows an embodiment of the moving barrier system, wherein the moving barriers are formed by a barrier sheet arranged parallel to the display.

FIG. 12 shows another embodiment using the principle of FIG. 9. On top of the fixed barrier strips 32 a plate or sheet 33a with parallel rectangular openings 33b and according frame 33b is provided. The frame 33b forms the movable barrier strips. In this case the plate as a whole can be moved by a moving mechanism 34, which is controlled by a controller 35. The image of the display 1 consisting of pixel 21 is controlled by a display controller 36. A common timing signal 37 switches between left image signals and right image signals and causes the exact synchronous movement of the plate of movable barrier strips 33.

Figure 13:
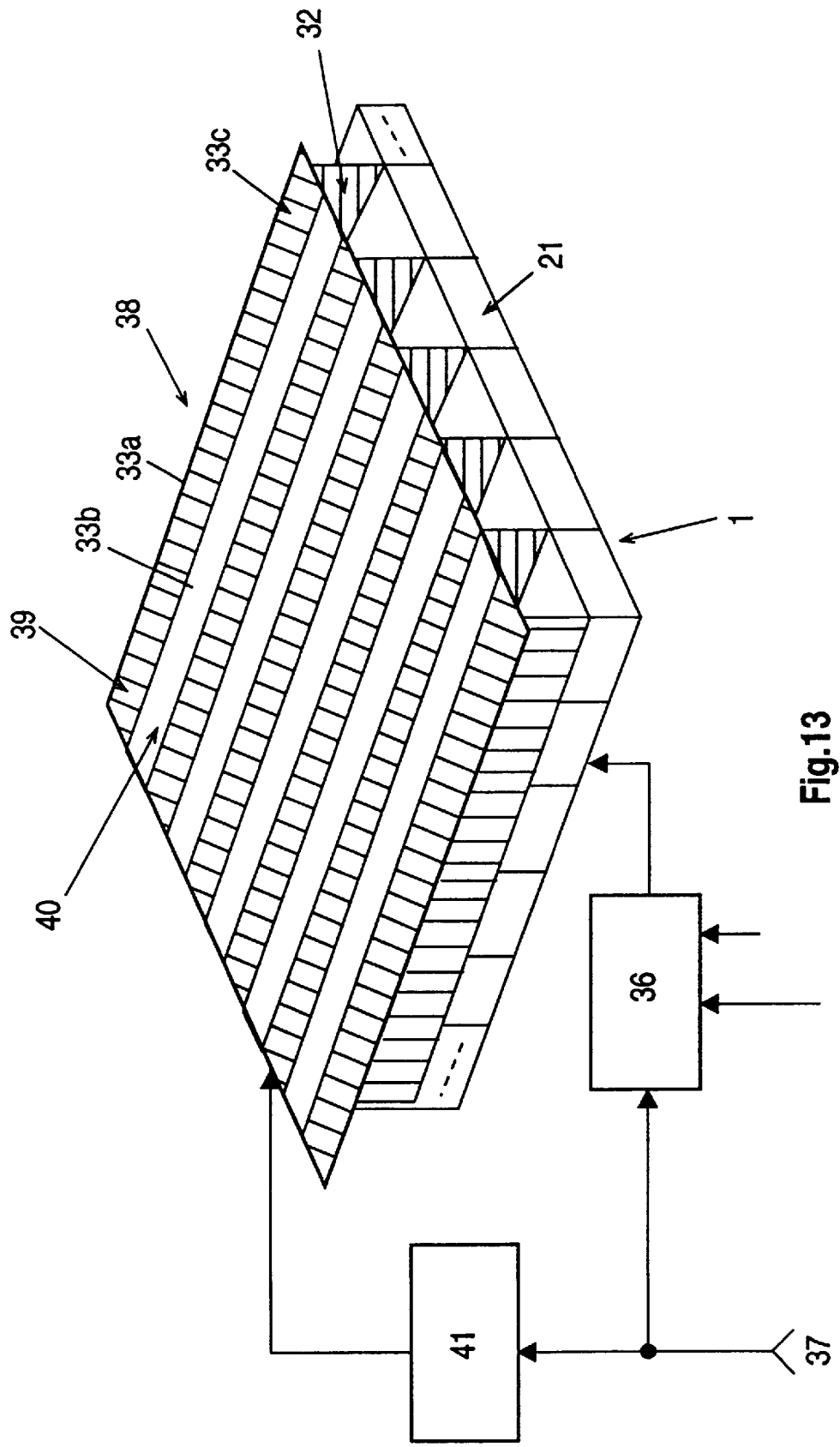
FIG. 13 shows an example of the moving barrier system according to FIG. 9, wherein the moving barriers are formed by a liquid crystal system.

FIG. 13 shows a second embodiment of the stereoscopic display system using a plate or sheet 33a. In this embodiment the openings 33b and the frame 33c are formed by a liquid crystal system 38. The orientation of the liquid crystal system is parallel to the image plane of the flat panel display 1. The liquid crystal system 38 comprises strips of liquid crystal shutters 39 and 40, which are arranged along the pixel columns and function as moving barriers 33. These liquid crystal shutters 39 and 40 can switch in dependence on the state from transparent to not-transparent and vice versa, which gives the same function as the moving barriers 33 in the FIGS. 9 and 12. According to the state shown in FIG. 13, shutter 39 realises the frame 33c and shutter 40 realises openings 33b.

The function of the liquid crystal shutters is controlled by a controller 41, which is synchronised with the display controller 36 through the common timing signal 37.

It may be mentioned that it is preferred that the display 1 is controlled by the controller 36 such that no loss of picture images occur. The according effect is indicated in FIG. 10 and 11, where it can be seen that only a part of the right pixel RP can be seen by the right eye RE (FIG. 10) and that only a part of the left pixel LP can be seen by the left eye LE (FIG. 11). The controller 36 can be controlled accordingly by an input of a user and/or by a signal, value of which depends on the distance between a viewer (who can be identical with the user) and the display 1.

Figure 14:
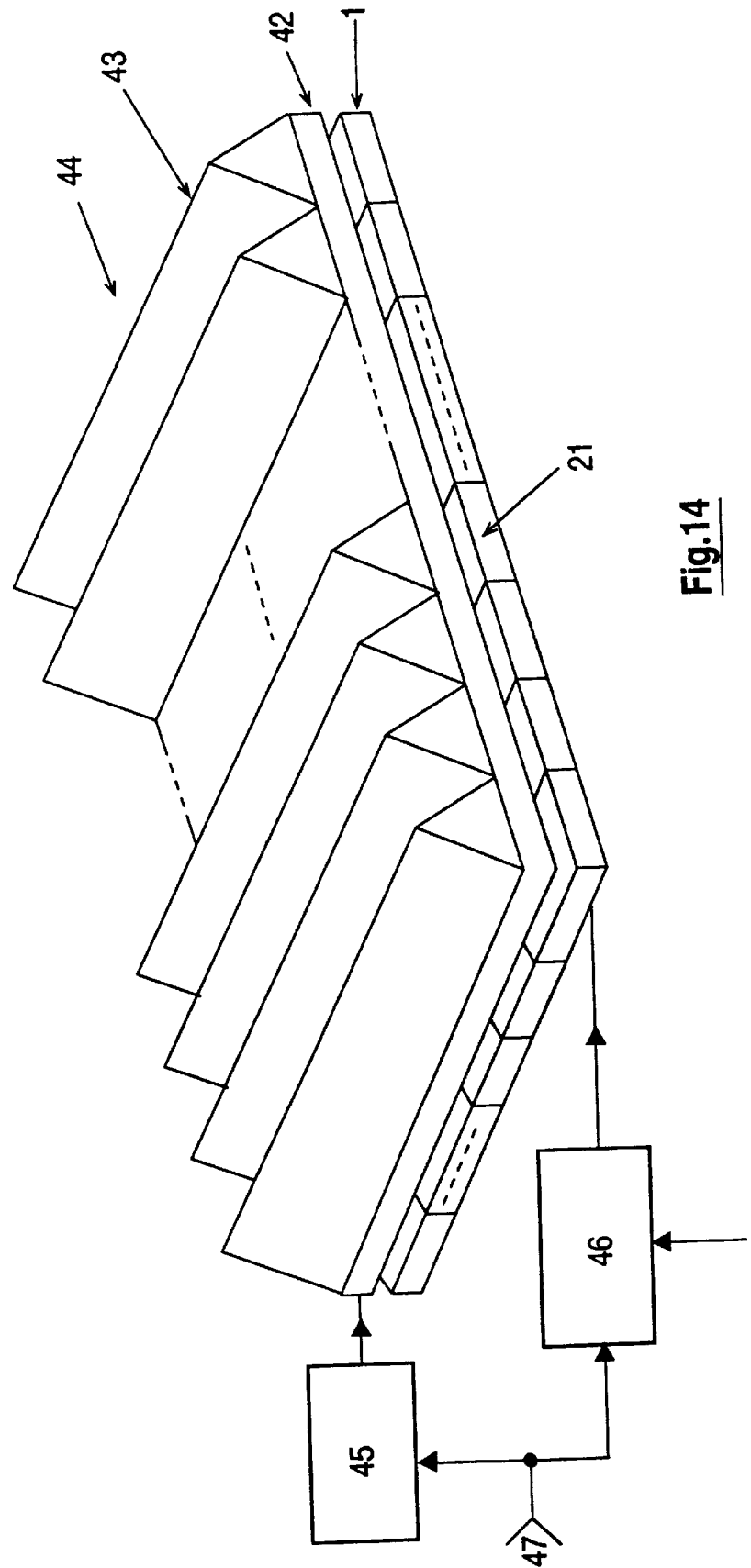
FIG. 14 shows a perspective view of a stereoscopic display system, wherein a polarizing device and polarizing prism sheet is used for the stereoscopic display system.

FIG. 14 shows a stereoscopic display system using polarized light for creating the stereoscopic effect. On top of a flat panel display 1 consisting of pixels 21 a polarizing device 42 is provided, which polarizes the light emanating from the pixels 21. On top of this polarizing device 42 rows of polarizing prisms 43 are provided, so that the bottom of each prism 43 covers one row of pixels 21. These polarizing prisms 43 form a polarizing prism sheet 44. The polarizing device 44 is controlled by a controller 45, whereas the display 1 is controlled by a display controller 46. Both controllers 45, 46 are timed by a common timing signal 47.

Figure 15:
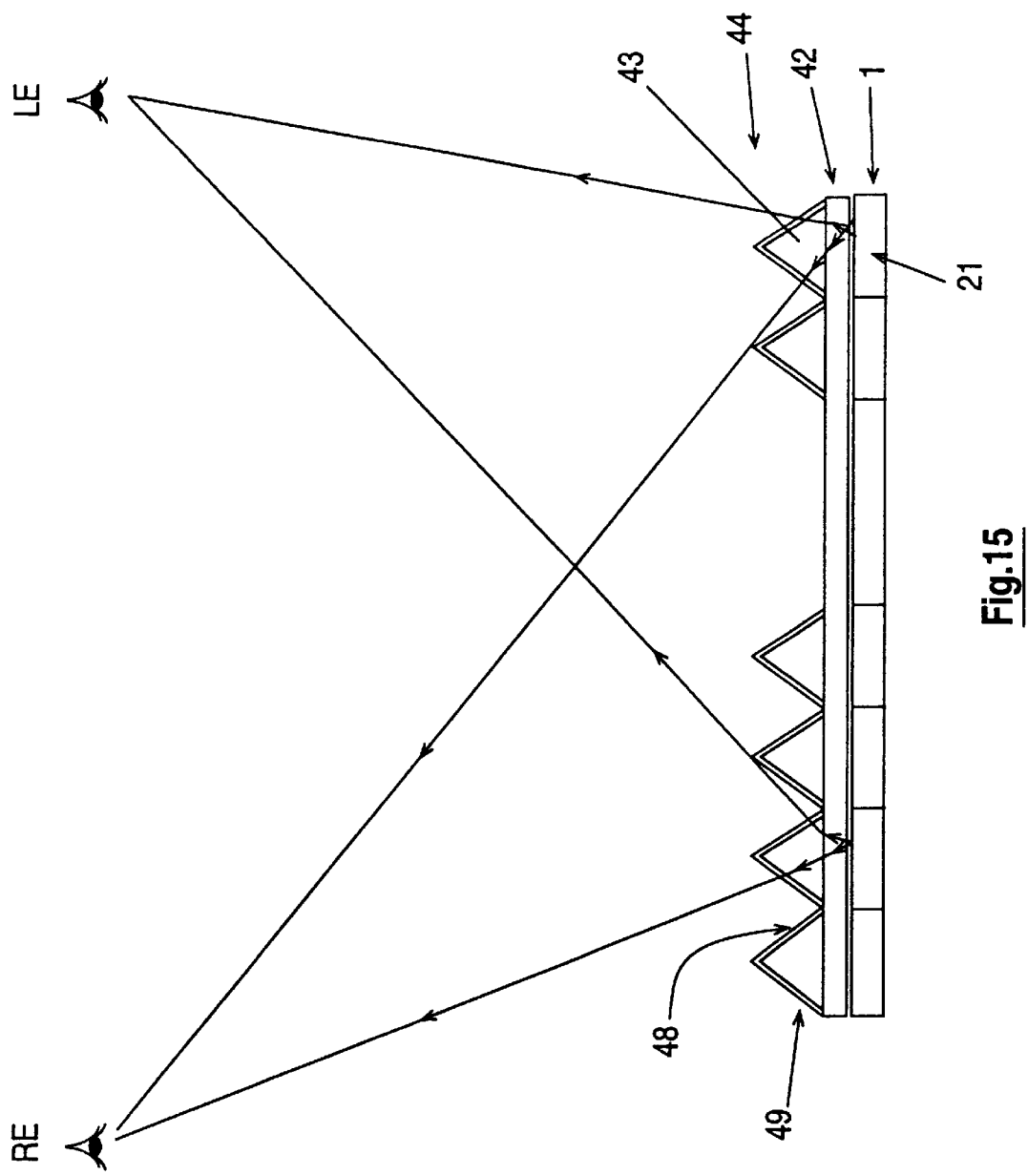
FIG. 15 is a cross section through the system according to FIG. 14.

FIG. 15 shows the stereoscopic display system according to FIG. 14 in cross section. The flat panel display 1 is overlaid by the polarizing device 42, on top of which a polarizing prism sheet 44 consisting of rows of prisms 43 rests. In FIG. 15 the left eye LE sees only the right side surface 48 of the polarizing prisms 43, whereas the right eye RE only sees the left side surface 49 of the polarizing prism. When the polarization direction of the polarizing device 42 is parallel to the polarization direction of the right side surface 48 of the polarizing prism 43, the flat panel display displays left eye image. During this time the rays of the flat panel display 1 are not able to project from the left side surface 49 of the polarizing prism 43, because the polarization direction of the polarizing device 42 is perpendicular to the polarization direction of the left side surface of the polarizing prism 43. After a moment the polarization direction of the polarizing device 42 is changed to the other direction and it is parallel to polarizing direction of the left side surface 49 of the polarizing prism 43. At this time the flat panel display displays right eye image. During this time, rays of the flat panel display are not able to project from right side surface 48 of the polarizing prism. After a moment the polarizing direction of the polarizing device 42 is changed again to the first polarization direction. This operation is continuously repeated. Therefore the display 1 displays right eye image and left eye image alternately, so that the right eye sees only right image and the left sees only left image in a time sharing manner. Therefore, if the above operation is fast enough, a stereoscopic image by the effect of after image and binocular parallax is created.

Figure 16:
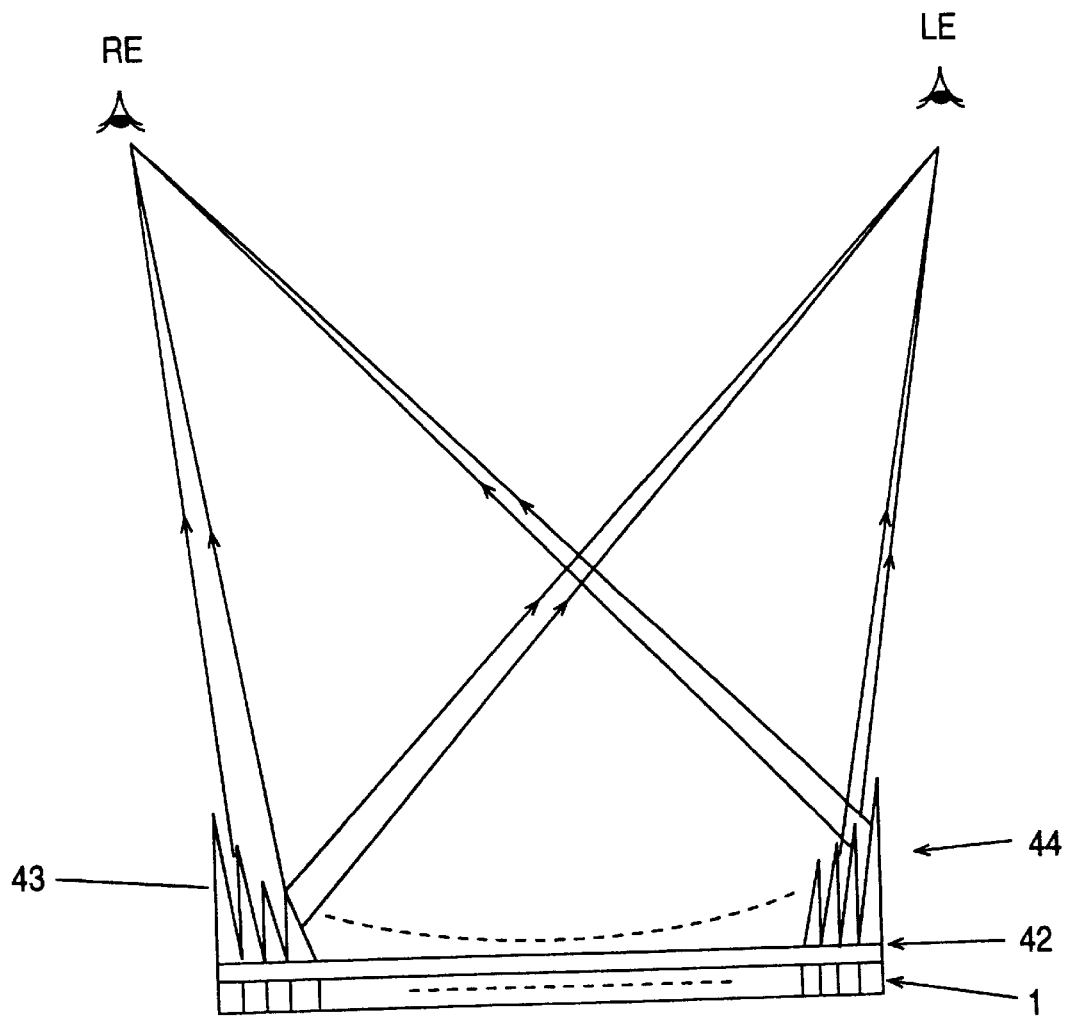
FIG. 16 is a cross section through a stereoscopic display system according to FIG. 13, wherein the shapes of the prisms differ from each other.

FIG. 16 shows a cross section through a stereoscopic display using polarized light, wherein the shapes of the polarizing prisms 43 of the polarizing prism sheet 44 differ from each other. The height of the prisms 42 decrease from the outer areas to the middle of the display 1, i.e an "outer" prism is higher than it adjacent "inner" prism. With such an arrangement the cross talk of left image ray and right image ray is decreased in comparison to the prism shape according to FIG. 15.

Figure 17:
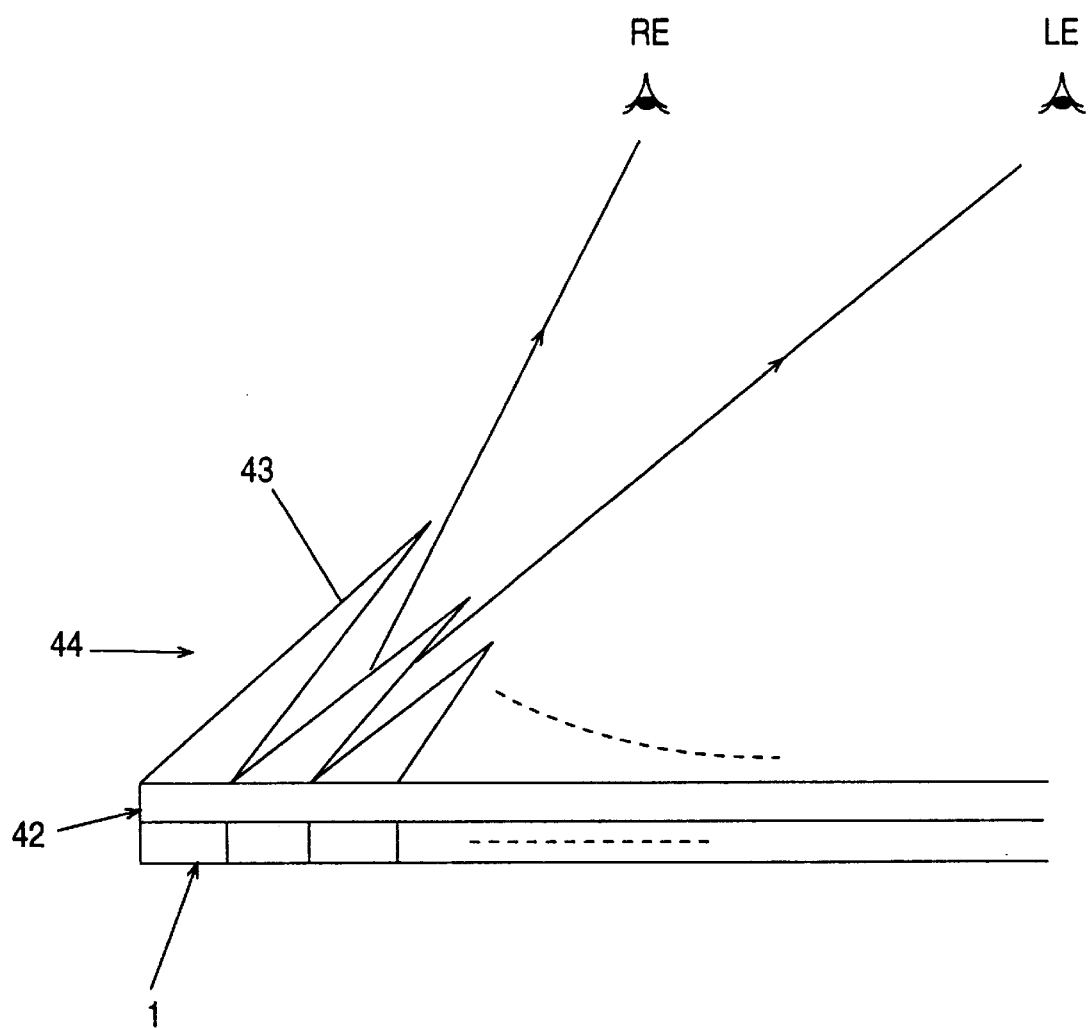
FIG. 17 is an embodiment of the polarizing stereoscopic display system, wherein the prisms overlap each other.

FIG. 17 shows another embodiment of the stereoscopic display system using polarized light, wherein the shapes of the polarizing prisms is different as in the embodiment of FIG. 16, but further the prisms overhang each other, seen from the outside to the middle of the display 1, i.e. an "outer" prism overlaps an adjacent inner prism. With such an arrangement and shape it is possible to use a wider display than the interpupil length.

I claim:

1. Stereoscopic display system comprising
    a display (1) with a pixel plane for alternately displaying right and left images, and
    a parallax barrier (4) in front of the display, said parallax barrier being made of barrier strips (5), said barrier strips being repositionable between the alternate displays of the right and left images, and said adjacent barrier strips being separated by a slit pitch, wherein the slit pitch is continuously variable, wherein the system comprises a pantograph (6), wherein said barrier strips (5) are connected to the pantograph (6).

2. Stereoscopic display system according to claim 1, characterized in that the system comprises a controller (13), which controls a moving rod mechanism (12) connected to the pantograph (6) for moving the pantograph (6), where said controller (13) is controlled by a control signal, value of which depends on an input of a viewer and/or on the distance between said viewer and said display (1).

3. Stereoscopic display system according to claim 2, wherein one or more of said barrier strips (5) is rotatable.

4. Stereoscopic display system according to claim 1 wherein the pantograph (6) is controlled on both ends by a moving-rod mechanism (12, 20).

5. Stereoscopic display system comprising
    a display (1) including a pixel plane formed of pixels in rows and columns for displaying right and left images,
    a polarizing device (42), which can switch between two states of polarization is arranged on top of the display (1),
    a polarizing prism sheet (44) comprising a plurality of prisms (43), which are arranged one prism (43) next to the other, so that one side of each prism covers one row of pixels, a second side of each prism transmitting the state of polarization from the polarizing device which is parallel to the polarization direction of said second side, and a third side of each prism transmitting the other state of polarization from the polarizing device.

6. Stereoscopic display system according to claim 5 each pixel column of the display (1) corresponds to one polarizing prism (43) of the polarizing prism sheet (44).

7. Stereoscopic display system according to claim 5 wherein the system comprises a polarizing device controller (45) and a display controller (46) to switch between left and right images, both of which are controlled by a common timing signal.

8. Stereoscopic display system according to claim 5 wherein said polarizing prisms (43) of the polarizing prism sheet (44) have decreasing heights from outer areas to middle areas of said display.

9. Stereoscopic display system according to claim 5 wherein prisms (43) of the polarizing sheet (44) overhang adjacent prisms (43).

* * * * *